United States Patent [19]

Bullock et al.

[11] Patent Number: 5,334,271
[45] Date of Patent: Aug. 2, 1994

[54] PROCESS FOR MANUFACTURE OF TWISTED PAIR ELECTRICAL CABLES HAVING CONDUCTORS OF EQUAL LENGTH

[75] Inventors: Roddy M. Bullock, San Marcos; Alfredo L. Cedrone, Austin; Michael L. Eckert, Manor; James G. Vana, Jr., Austin, all of Tex.

[73] Assignee: W. L. Gore & Associates, Inc., Newark, Del.

[21] Appl. No.: 956,330

[22] Filed: Oct. 5, 1992

[51] Int. Cl.$^5$ .................. H01B 13/08; H01B 13/14
[52] U.S. Cl. .................. 156/51; 156/53; 156/54; 156/55; 156/244.12; 156/244.24; 174/34; 174/113 R
[58] Field of Search .............. 174/34, 113 R; 156/51, 156/53, 54, 55, 244.12, 244.24

[56] References Cited

U.S. PATENT DOCUMENTS

| | | | |
|---|---|---|---|
| 2,790,299 | 4/1957 | Gillis et al. | 174/34 |
| 2,810,011 | 10/1957 | Burr | 156/55 X |
| 3,102,160 | 8/1963 | Cook et al. | 174/34 |
| 3,757,028 | 9/1973 | Schlessel | 174/34 X |
| 5,015,800 | 5/1991 | Vaupotic et al. | 174/34 |
| 5,142,100 | 8/1992 | Vaupotic | 174/34 X |

FOREIGN PATENT DOCUMENTS

| | | |
|---|---|---|
| 159736 | 10/1940 | Fed. Rep. of Germany ........ 156/55 |
| 2707197 | 2/1977 | Fed. Rep. of Germany . |
| 3721085 | 6/1987 | Fed. Rep. of Germany . |

*Primary Examiner*—Morris H. Nimmo
*Attorney, Agent, or Firm*—Gary A. Samuels

[57] ABSTRACT

A process for obtaining a twisted pair electrical signal cable having conductors of equal physical length and equal signal transmitting properties by passing a parallel pair of adhered insulated conductors of equal length through a closely-fitting die and twisting the conductors into a twisted pair cable. The process applies to thermopolymer insulated and ePTFE insulated conductors.

6 Claims, 5 Drawing Sheets

PROCESS FOR MANUFACTURE OF TWISTED PAIR ELECTRICAL CABLES HAVING CONDUCTORS OF EQUAL LENGTH

FIELD OF THE INVENTION

This invention relates to processes for manufacture of twisted pairs of insulated electrical conductors.

BACKGROUND OF THE INVENTION

A twisted pair is defined in the art of electric cable manufacture as a cable composed of a pair of insulated conductors twisted together around each other without a common covering of insulation. Each conductor is individually insulated separately prior to the twisting process. Twisted pairs are used for the transmission of electrical signals, both analog and digital, and may be used for interconnects driven in a single-ended mode or differential mode.

Signal wiring configured in a single-ended mode uses one conductor to connect the output of one device and the input of another device. If the devices being connected are high speed devices, the conductor should be a controlled impedance interconnection. This can be accomplished by placing ground wires near the signal wire or by providing an overall shield as with a coaxial cable. When a twisted pair is used for single-ended wiring, one of the conductors connects the output while the other conductor provides a return path usually referred to as ground. For this type of interconnect, it is not important that the two conductors of the pair be of equal electrical length.

High performance digital systems frequently use differentially-driven signals. Differential signals provide more precise timing, better noise immunity, and higher signal fidelity. With differential wiring the true signal and its logical complement are sent to the receiving device. The receiving device measures the differential voltage between the two signal lines. As with single-ended systems, if the digital signals are coming from high speed devices the signal wires must be placed in a controlled-impedance environment. There are several advantages to using this type of interconnect. In a twisted pair configuration the signal lines are run in close proximity to each other. Since the signals will be switching directly opposite to one another, the fields generated by these switching signals will cancel out, thereby generating very little electro-magnetic radiation. For the same reason, any radiated electro-magnetic fields impinging on this interconnect system will be sensed equally by both lines, and since the receiving device is only measuring the differential voltage between the two signals, this common-mode noise will be ignored by the receiver. A disadvantage of differentially driven interconnects is that now two conductors are required for each signal. A twisted pair construction is ideally suited to differentially-driven signal transmission. To assure proper operation, each conductor must be well matched for characteristic impedance and time delay.

If the time delays of the two conductors are not well matched, the true signal and logical complement will be received at different times, thereby limiting the useful physical length of interconnect which can be used before signal fidelity is compromised. For the time delays of the two conductors to be well matched, two conditions must be met simultaneously. First, each conductor must have the same dielectric constant, E, since the velocity of propagation (Vp), and hence time delay, of the conductor is determined by the relation: $Vp: 1/\sqrt{E}$. Secondly, the physical lengths of the two conductors must be matched.

It has been observed that it has become more difficult to meet the requirements needed for high-speed digital differentially-driven systems with twisted pair cables, partly because it is not easy to obtain insulated conductors having exactly equal length and equal signal transmission speed end to end. If one unreels a length of twisted pair cable manufactured by the several methods known in the art and cuts a length of cable from the reel, the signal conductors therein are found to be not of equal length owing to the stresses and movements of the insulated wires as the twisted cable is formed.

The present invention provides a process for preparing twisted pair cables having insulated conductors of equal physical and electrical length.

SUMMARY OF THE INVENTION

The invention comprises a twisted pair of electrical cables formed from insulated conductors having equal physical and electrical length and a process for its manufacture.

The process of manufacture of the cable of the invention comprises passing a pair of adhered insulated electrical conductors of equal length, which have been adhered along their length at the contact line between them, through a closely-fitting die, which rotates about the axis of the pair of insulated conductors passing through the die. The die is attached to a rotating apparatus which holds the entire payoff spool holding the parallel pair of insulated conductors. Since the process starts with conductors of precisely equal physical length, the twisted pair cable formed therefrom by the above process has conductors of equal physical length and therefore equal electrical properties providing that the properties of the conductors and insulation are equal along their length.

The complete process of manufacture varies in some details depending on whether the insulation on the conductors is a thermoplastic polymer or is expanded polytetrafluoroethylene (ePTFE), which is not thermoplastic. Different methods of adhering the two insulated conductors must be used to effect a useful bond between them depending on which type of insulation is used.

Where the insulation is thermoplastic, such as polyester, for example, a preferred way to insulate a conductor is to wrap the conductor with layers of polyester tape having on one side a coating of thermoplastic polyester adhesive. The conductor is wrapped with the tape adhesive side out, which provides easy adherence of two insulated conductors of equal length. Other thermoplastics and adhesives may be used. In the case of thermoplastic insulation on the conductors, after twisting an appropriate solvent is used to remove excess adhesive from the insulated conductors as well as dissolve the bond between them.

Where the insulation is ePTFE, a conductor is tape-wrapped with an ePTFE tape, paired together with another like conductor of equal length over a concave plate or shoe, and the pair passed into a heated medium, such as molten salt bath or hot air oven, the plate or shoe holding the two insulated conductors in contact along their length until a bond is formed between the insulations as they sinter. The preferred ePTFE insulation is that disclosed in U.S. Pat. Nos. 3,953,566, 3,962,153, 4,096,227, 4,187,390, 4,902,423, and 4,478,665 (assigned to W.L. Gore & Associates, Inc.), wherein the ePTFE is characterized as having nodes separated by fibrils of PTFE and a large amount of porosity. An ePTFE insulated bonded pair of conductors breaks apart on passing through a closely-fitting die. The size of the die can be easily and simply changed during simple process testing to select the degree of close-fitting which causes the individual insulated conductors to split apart readily and consistently. Since the individual insulated conductors are bonded up to the point of twisting, their physical lengths are equal. Even if the individual insulated conductors do not split apart, the function of the invention remains the same. The preferred process for adhering ePTFE insulated conductors is fully delineated in U.S. patent application Ser. Nos. 07/574,704 (now abandoned) and 07/747,315 now issued as U.S. Pat. No. 5,245,134, the disclosure which is hereby incorporated by reference.

The conductors of the cable may have interior layers of insulation beneath the ePTFE or thermoplastic insulation and adhesive so long as the outer layers comprise those two insulations as described above.

DETAILED DESCRIPTION OF THE INVENTION

The invention is now described in terms of the FIGURES to more carefully delineate in more detail the scope, materials, conditions, and processes of the invention.

Figure 1:
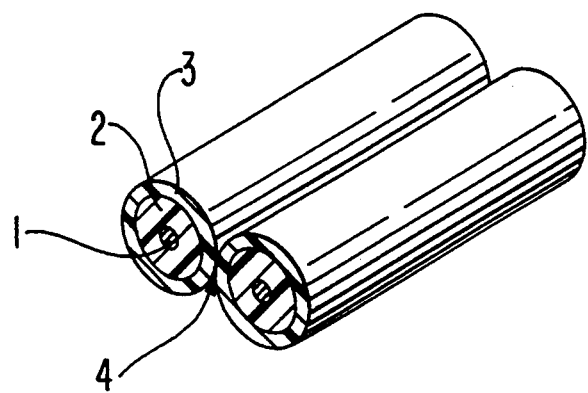
FIG. 1 is a perspective view of a pair of insulated conductors having two layers of insulation, the outer layers being bonded together.
Figure 2:
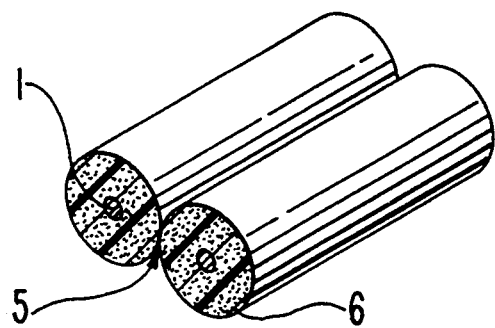
FIG. 2 is a perspective view of a bonded pair of ePTFE-insulated conductors.
Figure 3:
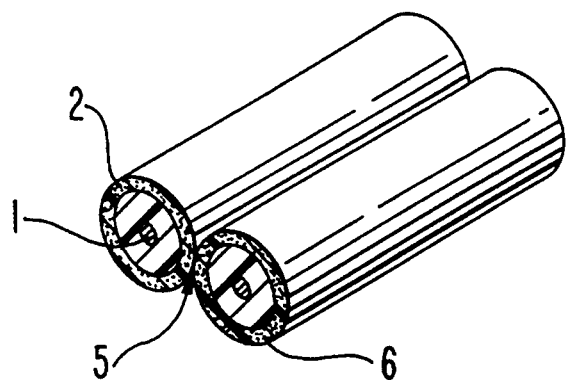
FIG. 3 is a perspective view of a bonded pair of ePTFE insulated conductors having an inner layer of a different insulation.

FIGS. 1, 2, and 3 describe pairs of insulated cables suitable for use in the process of the invention. Two electrical conductors 1 are shown surrounded by a preferably thermoplastic insulation 2 which has coated on the outside a layer of adhesive 3. A conductor 1 is usually wrapped with a polyester tape having coated on at least one side with a heat sealable polyester adhesive. A preferred form of such tape is Milene ® tape, obtainable from W.L. Gore & Associates, Inc. Conductor 1 is wrapped, adhesive side out, with layers of tape to form the insulated conductors shown in FIG. 1. A pair of the insulated conductors is passed side by side in contact with each other through a hot air oven to bond the insulations 2 together at bond line 4. The tape-wrap may be helically or cigarette wrapped around the conductor. Other thermoplastic polymers and adhesives may be used instead of the preferred materials. The thermoplastic insulation 2 may also be extruded onto conductor 1 then coated with adhesive 3.

FIG. 2 shows a pair of conductors 1 insulated by ePTFE. The respective ePTFE insulations 6 of a pair of conductors are caused to adhere to each other by passing a pair of the insulated conductors over a grooved shoe or plate to hold them in contact with each other while the insulated conductors are being passed through a molten salt bath at a temperature to cause the ePTFE insulation to sinter and fuse to the adjacent insulation. A hot air oven may be used instead of a salt bath. A temperature in the range of about 325°–350° C. is usually used for sintering ePTFE.

FIG. 3 shows a pair of adhered (along line 5) insulated conductors 1 covered with a thermoplastic insulation 2 and then an outer insulation of ePTFE 6.

Figure 4:
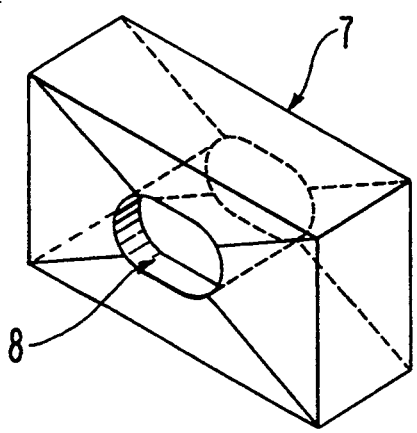
FIG. 4 is a perspective view of a die through which a bonded pair of insulated conductors is pulled to break them apart as they are being twisted into a twisted pair cable.

FIG. 4 illustrates a die 7 for pulling an adhered pair, such as those shown in FIGS. 1–3, through a closely-fitting groove 8 which matches the dimensions of the pair of insulated conductors. The size of the groove 8 of die 7 may be changed readily by simple testing in order to select the size of groove 8 which will cause the bond 5 between insulations 6 to break as the joined insulated conductors are pulled through die 7. The outside shape and dimensions of die 7 may be varied considerably to suit the engineering needs of the twisting apparatus. In the case of thermoplastic insulations 4 and 3 and adhesive, die 7 is used for twisting only.

Figure 5:
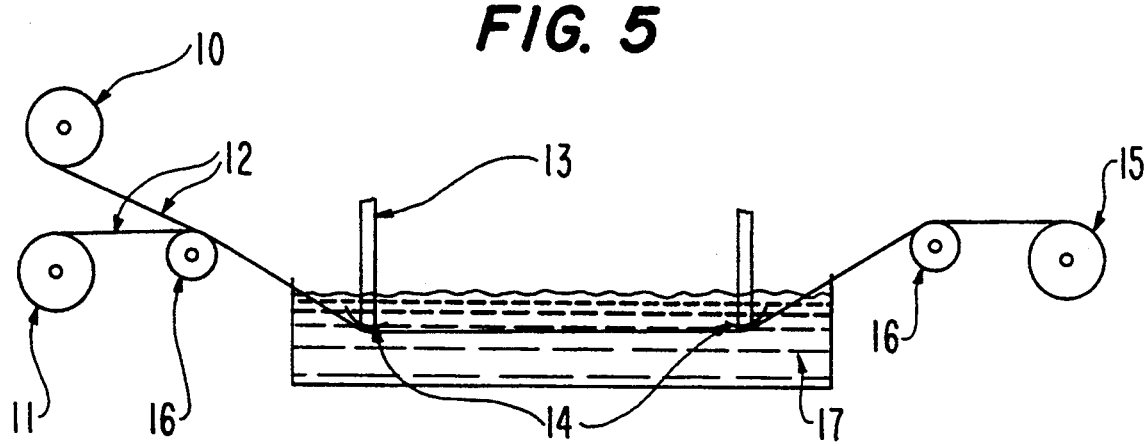
FIG. 5 is a schematic view of a process for adhering a pair of ePTFE insulated conductors by passing them across a concave-grooved plate to hold the conductors in contact while sintering occurs in a hot salt bath.

FIG. 5 shows a schematic diagram of a suitable process for joining parallel ePTFE insulated conductors along their length. Insulated conductors 12 pass off reels 10 and 11 over guide roll 16 into salt bath 17 over grooved shoes 14 held in the salt bath by supports 13. The sintered bonded together parallel conductor pair is taken up on take-up reel 15.

Figure 6:
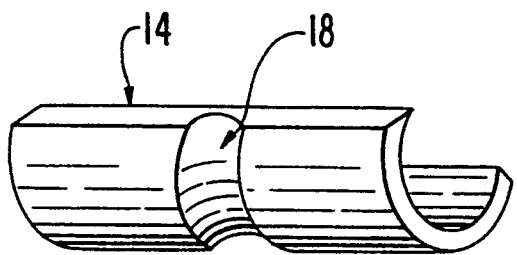
FIG. 6 is a perspective view of a grooved plate or shoe for holding insulated conductors in contact as they move across it together.

FIG. 6 describes grooved plate or shoe 14 which has a concave groove 18 formed therein which causes insulated conductors passing over plate 14 to contact each other while they fuse or sinter together to form a bond along the contact line between them or adhere to each other.

Figure 7:
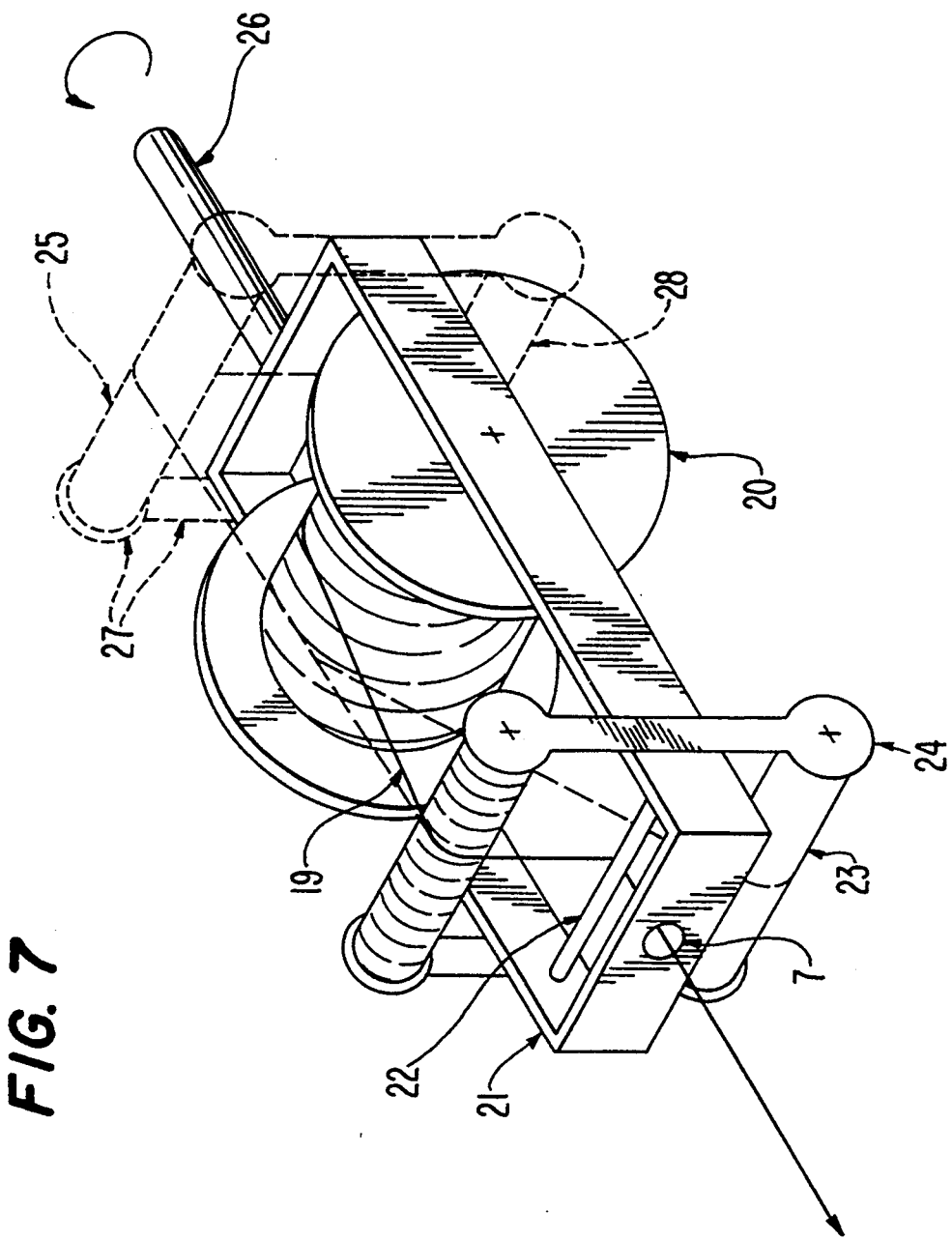
FIG. 7 is a perspective view of a pair of parallel adhered insulated conductors passing from a reel over tensioning rollers and bar through a die in a cable twister to break apart the insulated conductors as they are being formed into a twisted pair of equal length conductors.
Figure 8:
FIG. 8 is a perspective view of a twisted pair of electrical cables made by the process of the invention from the pair shown in FIG. 2.

FIG. 7 shows a cable twister upon which is mounted a payoff spool 20. Spool 20 contains coiled on it a parallel pair 19 of adhered insulated conductors. The cable twister also comprises a rectangular frame 21 which supports spool 20, a shaft 26 to connect the twister to a mechanism for rotating it, a second frame 24 affixed at generally a right angle to frame 21 and supporting rollers 23 and 28. A spring-loaded roller tension bar 22 is also affixed to and supported by frame 21. An optional addition of frame 27 is shown dotted in, which may supply additional rollers 25 if it is desired to increase the length of parallel pair 19 from spool to die. Die 7, a round alternative version of the die shown in FIG. 4, is attached to and supported by frame 21.

To twist and separate (in the case of ePTFE insulation) parallel pair 19, pair 19 is fed off of spool 20 over one of rollers 23 then over roller tension bar 22 into die 7, from which it passes on to a take-up spool. As parallel pair 19 is being passed over the various rollers and bars and through die 7, the entire cable twister as a unit is being rotated by shaft 26 which results in parallel pair 19 being formed into a twisted pair and in the case of ePTFE insulated conductors, the joining bond between the two insulated conductors usually being broken as they pass through die 7. Where the insulation is thermoplastic, the insulation of the twisted pair remains joined and the pair is later separated by use of an appropriate solvent as mentioned above and residual adhesive coating the surface of the insulation after twisted pair cable formation is also removed at the same time.

An advantage of the process is that it is relatively easy to make parallel adhered pairs of insulated conductors of equal physical length, then twist them into a twisted pair cable, whereas it is more difficult to twist a pair of insulated conductors into a cable, then cut the cable to yield a segment of cable having conductors of equal length. Twisting processes known in the art inherently yield cables having conductors of different physical lengths in the same segment of twisted cable.

We claim:

1. A process for manufacturing a cable in the form of a twisted pair of insulated electrical conductors having equal physical lengths, comprising the steps of:
   (a) adhering together along their length two parallel insulated electrical conductors of equal length by bonding the insulations thereof together along the line of contact between the two insulations;
   (b) passing the adhered insulated conductors as a unit through a rotatable close-fitting die; and
   (c) twisting the insulated conductors to form a twisted pair cable having insulated conductors of equal length.

2. A process of claim 1 wherein the pair of insulated conductors have an outer layer of adhesive comprising the additional step of dissolving the adhesive from the twisted pair of cable formed by said process.

3. A process of claim 1 wherein the insulated conductors are formed by extruding a thermoplastic insulation around each electrical conductor, applying a coating of adhesive to the insulation of each conductor, and adhering the two insulated conductors together along their length.

4. A process of claim 1 including forming insulated conductors by wrapping each of said conductors with an adhesive-coated thermopolymer tape, adhesive side out, and adhering two insulated conductors together along their length.

5. A process of claim 1 including tape-wrapping a layer of expanded polytetrafluoroethylene insulation around each of said insulated conductors, holding in contact along their length along the contact line of the insulations of said insulated conductors by passing said insulated conductors over the concave surface of a shaped plate or shoe, adhering said insulated conductors by heating said insulated conductors while in contact at sintering temperatures for a sufficient time to sinter the insulations of said conductors together along the contact line of said insulations, then cooling.

6. A process of claim 1 including extruding a layer of expanded polytetrafluoroethylene insulation around each of said insulated conductors, holding in contact along their length along the contact line of the insulations of said two insulated conductors by passing said two insulated conductors over the concave surface of a shaped plate or shoe, adhering said two insulated conductors by heating said two insulated conductors while in contact at sintering temperatures for a sufficient time to sinter the insulations of said two insulated conductors together along the contact line of said insulations, then cooling.

* * * * *